Nov. 9, 1965  J. F. GRUNDMANN  3,216,623
APPARATUS FOR CONTROLLING FLUID FLOW
Original Filed Nov. 2, 1961

JOHN F. GRUNDMANN
INVENTOR.

KENDRICK, SCHRAMM & STOLZY
BY
ATTORNEYS.

Nov. 9, 1965 J. F. GRUNDMANN 3,216,623
APPARATUS FOR CONTROLLING FLUID FLOW
Original Filed Nov. 2, 1961 2 Sheets-Sheet 2

JOHN F. GRUNDMANN
INVENTOR.

KENDRICK, SCHRAMM & STOLZY
BY
*A. Donald Stolzy*
ATTORNEYS.

United States Patent Office 3,216,623
Patented Nov. 9, 1965

3,216,623
APPARATUS FOR CONTROLLING FLUID FLOW
John F. Grundmann, 651 S. Irena Ave.,
Redondo Beach, Calif.
Original application Nov. 2, 1961, Ser. No. 149,567, now Patent No. 3,161,206, dated Dec. 15, 1964. Divided and this application Mar. 19, 1963, Ser. No. 266,457
5 Claims. (Cl. 222—146)

This application is a division of co-pending application Ser. No. 149,567, filed Nov. 2, 1961, by John F. Grundmann for Method and Apparatus for Controlling Fluid Flow, now Patent No. 3,161,206, dated Dec. 15, 1964.

This invention relates to the fluid mechanics art, and more particularly to a method of and apparatus for controlling the flow of fluid.

Although the present invention will have application in a great many fields and is not therefore to be limited to any particular one including that described in this paragraph, it has been found especially useful in the control of the circulation of hot water in coin-operated vending machines for dispensing brewed coffee, brewed coffee being distinguished from coffee made by mixing a pulverized dehydrated coffee bean extract or "instant" coffee with hot water.

In such machines coffee is brewed from ground as, for example, in a dripolator where hot water is passed through the grounds and the grounds thereafter separated from the coffee liquor.

Athough the present invention is especially applicable to a brewed coffee vending machine, it is also applicable to an instant coffee vending machine. A problem does exist relative to providing water of a uniform temperature in an instant automatic vending machine, the temperature of the water being independent of the demand on the machine. That is, during coffee breaks in places of business, the machine demand may be one cup per minute whereas the demand on the machine for a weekend may be zero. Due to the fact that water carrying tubing connected from a heated supply tank to a dispensing valve, the valve itself, and other connected high heat conducting metal structures in the machine may be cold on a Monday morning, it would naturally follow that the first cup of coffee dispensed by the machine would likely be cold. Note will be taken that the number of calories in a single cup of boiling water may be very small in comparison to the large heat capacity of the above-mentioned conducting metal structures.

The problem of maintaining dispensed coffee at a uniform temperature regardless of demand exists in instant coffee vending machines, but this problem becomes more perplexing in brewed coffee blending machines because hotter brewing water is required. For example, water at 200° Fahrenheit is normally required, this temperature being only twelve degrees below the boiling point of water. Still further, it will be appreciated that heat transfer is proportional to the difference in temperature of the water and the heat conducting metal structures with which it comes in contact, and water, of course, cannot be heated to a temperature greater than boiling without considerable difficulty. Hence, the drop in temperature attributable to a cold distribution system in a brewed coffee vending machine because the water temperature required for the former is higher.

It is to be noted that the present invention applies to both instant coffee and brewed coffee vending machines, although the problem it solves is accentuated in a brewed coffee vending machine. The relative ease with which "instant" coffee can be made is undeniable because most conventional instant coffee powders do, in fact, dissolve in water instantaneously and further because the separation of grounds from the coffee liquor is therefore not necessary. However, a substantial demand for brewed coffee vending machines exists because of the undeniably different flavors of brewed and instant coffees, if not for the reason that brewed coffee is better in quality than instant coffee.

In the prior art, a brewed coffee vending machine has been provided with a complicated electrically operated valve system and an electric motor driven centrifugal pump to circulate hot water continuously, i.e. twenty-four hours a day, through the above-mentioned structures including the tube connecting the water supply tank to the water dispensing valve, the water dispensing valve itself and through other surrounding highly conductive metal structures to keep them hot, so that the temperature of the coffee dispensed by the machine will not vary considerably or at all regardless of coffee demand.

The present invention overcomes the above-described and other disadvantages of the prior art by providing a method including the steps of filling a closed piping loop having an upwardly extending input leg, a downwardly extending output leg, and a chamber connecting the lower ends of the legs with a fluid, heating fluid in the connecting chamber, and cooling fluid in the legs at different corresponding rates. By cooling one leg of a hot water circulation system in an automatic brewed coffee vending machine at a rate greater than the other, the density of the water in the one leg increases to a magnitude greater than that in the other, and the requirement for circulation to keep the dispensing parts of the machine always at a relatively high temperature is met. "Lighter" water in the one leg rises, and "heavier" water in the other leg falls. The differential pressure across the closed piping loop to cause circulation is small; however, the same unquestionably has been found to be adequate and without the requirements of the complicated and expensive prior art valve system and circulation pump.

According to an outstanding feature of the present invention, apparatus is provided including a tank, an inverted U-shaped tube having downwardly extending legs connected to the tank at different corresponding positions, the legs being constructed in a manner such that one has a different heat loss than the other, and means to heat the tank. The construction of each leg in a manner such that one has a heat loss to the atmosphere different than the other may be achieved by providing insulation for only one of the two legs. Thus, a striking advantage of this apparatus of the invention is that for a constant water temperature in the tank, circulation in the tub increases as the ambient temperature decreases because water in the leg not insulated becomes still "heavier" to increase the differential circulation pressure. Hence, in accordance with this advantage of the present invention, compensation for low and changing ambient temperatures is made automatically to keep the water dispensing valve, the tube connected from the valve to the tank, and other highly conductive metal structures connected with or positioned adjacent thereto at a substantially constant and at a relatively high temperature independent of ambient temperature.

According to another feature of the invention, the insulated leg of the tube opens into the tank near the bottom thereof, e.g., at the center of the tank, the leg not insulated opens in to the tank near the top of it, e.g., at one side. In this manner, the differential pressure causing circulation in the tube is increased not only by this leg spacing to prevent cold water escaping from the leg not insulated from entering the insulated leg, but also by heating water in the tank at the bottom thereof and relying on the finite, albeit it small, differential temperature between water at the bottom and at the top of the tank.

A brewed coffee vending machine made in accordance with the present invention may include several other new and improved component parts or arrangements thereof or new and improved arrangements of conventional parts as follows: dispensing means connected with the tube between the legs, a first check valve in one of the legs, the first check valve being adapted to close when pressure in a portion of the one leg between the first check valve and the dispensing means is greater than that in a portion of the one leg between the first check valve and the tank, a second check valve in the other of the legs, the second check valve being adapted to close when a differential of pressure across it is of a predetermined magnitude regardless of whether or not the water pressure thereabove in the other leg is higher or lower than the water pressure therebelow in the other leg, insulation surrounding only a portion of the other leg of the tube connecting the second check valve to the tank, a displacement cylinder connected with the tube between the check valves, the cylinder having a piston therein to move water outwardly of the dispensing means, and means to move the piston into the cylinder at a rate to cause pressure in the tube between the check valves to rise to a sufficient magnitude to close both of the valves and to move the piston out of the cylinder at a rate to cause pressure in the tube between the check valves to be sufficiently low to cause the second check valve to close again, whereby cooling of the cylinder, the piston, the dispensing means, and the tube between the check valves by cooler water in the other leg thereof below the check valve is prevented.

As stated previously, several other new and improved component parts may also be employed to advantage in accordance with the present invention. One of these is a fluid flow control device including a float operated check valve, or a gravity operated check valve.

According to a feature of the present invention, the fluid flow control device or check valve for the insulated tube may include a cylindrical pipe having a lower internal cavity of a predetermined diameter, a middle internal cavity of a second predetermined diameter greater than said first predetermined diameter, and an annular shoulder at the upper end of the lower internal cavity, a cylindrical float extending downwardly in the lower internal cavity into the middle internal cavity. The average density of the float is less than that of fluid in the pipe section. A disc-shaped flange having a diameter less than the second predetermined diameter and greater than the first predetermined diameter is then fixed to the upper end of the float in the middle internal cavity in a plane approximately perpendicular to the axis of the float to seat on the shoulder when pressure above the float exceeds the pressure below the float by a predetermined value. Stop means to limit movement of the disc-shaped flange on the float upwardly in the middle internal cavity beyond a predetermined distance from the shoulder is also provided. The stop means may comprise a spider fixed to the pipe section internally thereof above the disc-shaped flange. A pin is then fixed to the disc-shaped float at the center thereof in a position extending downwardly in the pipe section to limit the upward vertical movement of the float therein.

According to still another feature of the present invention, a fluid flow control device or check valve for the leg of the tube not insulated may include that described in the paragraph immediately preceding with the exception that an annular flange is provided extending radially inward at the upper end of the middle internal cavity, and an upper internal cavity is provided above the annular flange having a third predetermined diameter less than the annular flange inside diameter, the annular flange inside diameter also being less than the second predetermined diameter. A spider assembly is then provided in the upper internal cavity, the spider assembly including a spider slidable vertically in the upper internal cavity and having an outside diameter greater than the annular flange inside diameter to rest thereon, the spider assembly also including a projection fixed centrally with the spider extending downwardly into the middle internal cavity to hold the disc-shaped flange on the float in spaced relation to the annular flange when the spider rests thereon, the spider assembly having an average density greater than that of the fluid.

The above-described and other advantages of the present invention will be better understood from the following description considered in connection with the accompanying drawings.

In the drawings which are to be regarded as merely illustrative:

Figure 1:
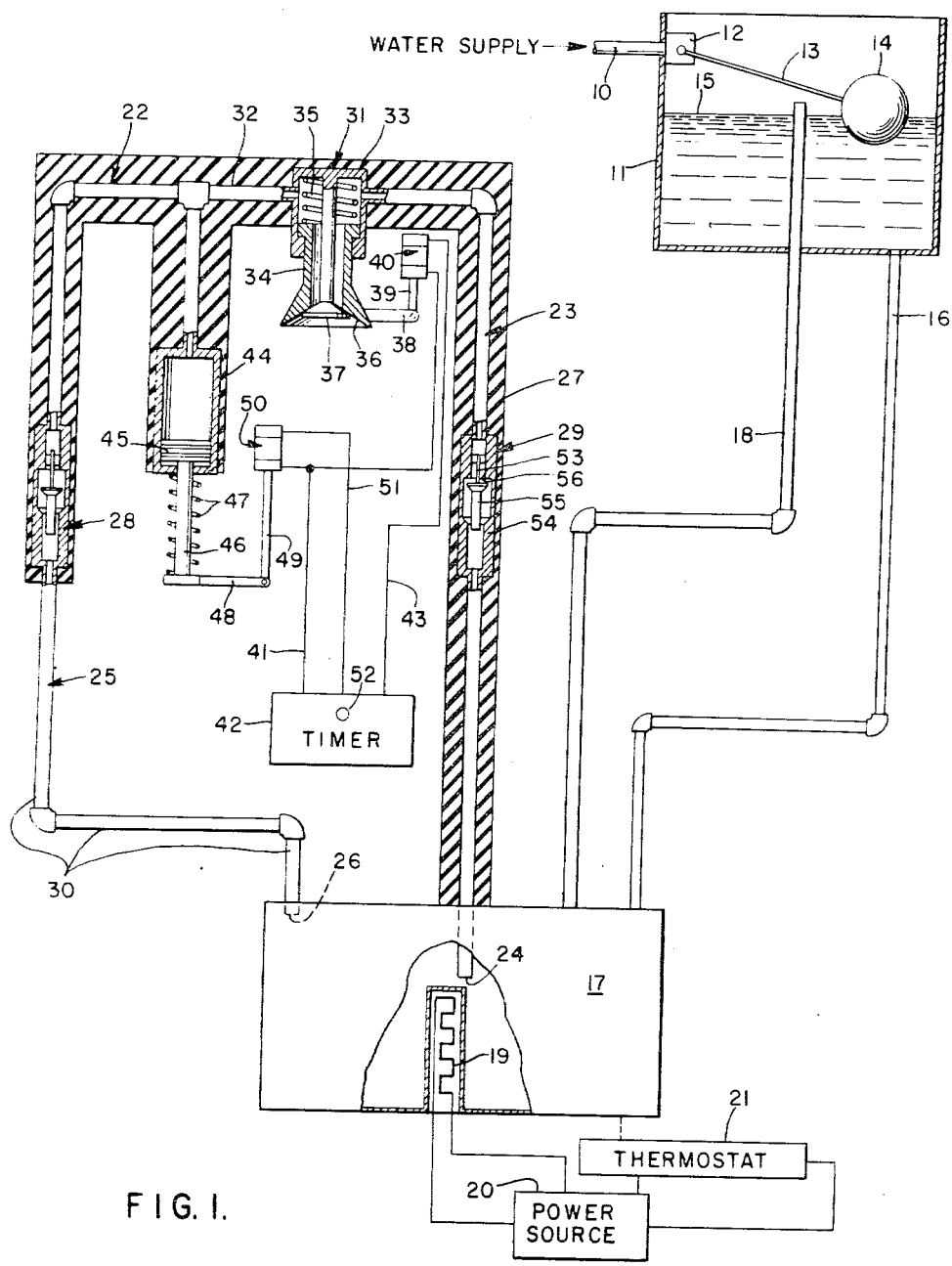
FIG. 1 is a diagrammatic view of hot water dispensing apparatus constructed in accordance with the present invention.

In the drawing in FIG. 1, water is supplied to the system by means of a conduit 10 which enters a reservoir 11. Conduit 10 may be a water pipe or conduit from any pressurized supply. At the end of conduit 10, a valve 12 is positioned in a manner such that an arm 13 operates the same, arm 13 having a float 14 connected to one end thereof to be buoyed in water indicated at 15 in reservoir 11. Reservoir 11 has two other connections thereto, one being an output pipe 16 connected to a water tank 17 and a standpipe 18 also connected to water tank 17 as a safety measure to prevent a high pressure building up in the system in the event the pipe 16 becomes plugged. It is to be noted that the sides of reservoir 11 extend upwardly above the entire remainder of the apparatus disclosed in the system, whereby the water level at 15 may exceed the heighth of any part in the remainder of the system to supply water thereto under pressure via pipe 16. In other words, a pressure head is provided by the level of water at 15 above the remainder of the system to maintain all the component parts of the system completely full of water and the conduits to and from them.

Water in tank 17 is heated by means of a heating element 19 located internally of tank 17, heating element 19 being supplied with electric power by a power supply 20 having an automatic control thereof by a thermostat 21 to maintain the temperature of the water in tank 17 at a substantially constant temperature, for example, at about 200° F.

Tank 17 has a substantially U-shaped tube 22 or plumbing system connected thereto, an input leg 23 being connected to tank 17 having an opening at 24 therein adjacent to the bottom thereof. U-shaped tube 22 is also provided with an output leg 25 having an opening in tank 17 located at 26 near the top thereof at one side, opening 24 of leg 23 being near the center of the tank 17 adjacent to heating element 19. Location of lower end 24 of input leg 23 near the bottom of the tank 17 and adjacent heating element 19 causes water entering leg 24 to be at a temperature higher than that escaping from leg 25 at its lower end 26. In addition to the fact that hot water in leg 23 rises and cold water in leg 24 falls, as will be described in greater detail hereinafter, the location of the lower ends 24 and 26 of legs 23 and 25, respectively, in tank 17 also facilitates circulation of water in inverted U-shaped tube 22.

Insulation indicated at 27 is provided around substantially all the water-carrying structures connected with tube 22 from tank 17 at the connection of leg 23 to the position of a check valve 28 connected in leg 25. Portions 30 of leg 25 from check valve 28 to its lower end 26 indicated at 29 are left bare. Hence, water will cool at a substantially faster rate in portions 30 of leg 25 than in other portions of U-shaped tube 22 or other structure connected therewith. For this reason, the water in portions 30 of leg 25 will become heavier than that in leg 23 and water will circulate in tube 22 as long as valve 28 is open, as well as a check valve located in leg 23.

Although valves 28 and 29 are very similar, they are different in one respect. Valve 29 closes when pressure above it in leg 23 exceeds a pressure below it by a predetermined amount. Valve 29 never closes when the pressure below it in leg 23 exceeds the pressure above it. On the other hand, valve 28 in leg 25 closes when pressure above the valve exceeds the pressure below it by a predetermined amount and vice versa, i.e., the valve 28 also closes when the pressure in leg 25 below it exceeds the pressure in leg 25 above it.

A dispensing valve assembly 31 is located in the topmost portion 32 of the U-shaped tube 22, valve assembly 31 including a housing 33 inside of which a dispensing cylinder 34 is movable vertically against the force of a helically coiled spring 35. A frusto-conical surface comprising a valve seat 36 is located at the bottom of cylinder 34. A valve 37 is fixed to the upper end of housing 33, the seat 36 being movable with cylinder 34 upwardly in housing 33 to permit the escape of hot water between valve 37 and valve seat 36 onto or through coffee grounds, in a suitable container, not shown. Cylinder 34 is moved upwardly by means of a fixed connection with a linkage 38 which is moved upwardly by an armature 39 of a solenoid 40 having a ground connection to a lead 41 at the output of a timer 42 and a second lead 43 connected from timer 42 thereto.

Also connected in top portion 32 of U-shaped tube 22 is a cylinder 44 having a piston 45 movable vertically therein on a piston rod 46. Piston 45 is normally biased to the position shown in FIG. 1 by means of a helically coiled spring 47. Piston rod 46 is movable with a link 48 fixed thereto which in turn is moved vertically upward by a connection with an armature 49 of a solenoid 50. Solenoid 50 is also connected to ground lead 41 of timer 42 and also to timer 42 by a lead 51 thereto. Timer 42 is provided with a push button 52 to initiate the operation of solenoids 40 and 50 simultaneously or successively.

The operation of the system illustrated in FIG. 1 is as follows: Water is supplied by conduit 10 and float 14 operates valve 12 to maintain water level 15 above the remainder of the system. Water is supplied through pipe 16 to tank 17, the latter being watertight. Vent 18 is provided simply for safety reasons and is generally not involved in the operation of the system. Water in tank 17 is heated by heating element 19 operated from thermostat 21 and power supply 20. Water circulates upwardly in leg 23 of U-shaped tube 22 through valve 29 which remains open because a pin 53 therein fixed relative to a housing 54 thereof prevents a float 55 therein from sealing off an internal bore 56. Hot water is circulated up in leg 23, across top portion 32 and downwardly in leg 25 of U-shaped member 22, all of the same being insulated at 27. Water also circulates downwardly through valve 28. Circulation is created by the difference in heat loss of leg 23 and the portions 30 of leg 25 inducing a greater density of water in portions 30 of leg 25 than in leg 23. Valve 28 closes when very small differential pressure exists across it in either direction; however, the differential pressure created by the different densities of the water in legs 23 and 25 is insufficient to close the valve. Hence, hot water flows through leg 25 downwardly through portions 30 into tank 17.

When push button 52 of timer 42 is depressed, the opening of solenoid 40 is actuated to dispense water from the valve assembly 31 and simultaneously therewith or immediately thereafter solenoid 50 is operated to cause piston 45 to rise in cylinder 44 and therefore displace water therein and cause water to flow out of the valve assembly 31. Under this condition, the pressure in U-shaped tube 22 above valves 28 and 29 increases rapidly and to such an extent that both of the valves close. The travel of piston 45 in cylinder 44 may be the entire length of the cylinder or some portion thereof fixed by any convenient means. In the present case, timer 42 simply de-energizes solenoid 50 after a predetermined length of time as well as solenoid 40. Solenoid 40 alternatively may be energized at a time immediately preceding the time that solenoid 50 is de-energized. Upon de-energization of the solenoids, the action of spring 47 rapidly draws piston 45 back to the piston shown in solid lines in FIG. 1, pressure below atmospheric being created in the cylinder 44 and therefore in U-shaped tube 22 above valves 28 and 29. In this case, although valve 29 stays open because pin 53 limits movement of float 55 upwardly in bore 56, valve 28 actually does close. It is in fact a feature of the invention that this valve closes in this event, whereby the withdrawal of water from portions 30 of leg 25 into U-shaped tube 22 above valve 28 is prevented, the same thereby increasing the warming efficiency of U-shaped tube 22 and the structure associated or connected therewith, including valve assembly 31, cylinder 44 and piston 45.

Figure 2:
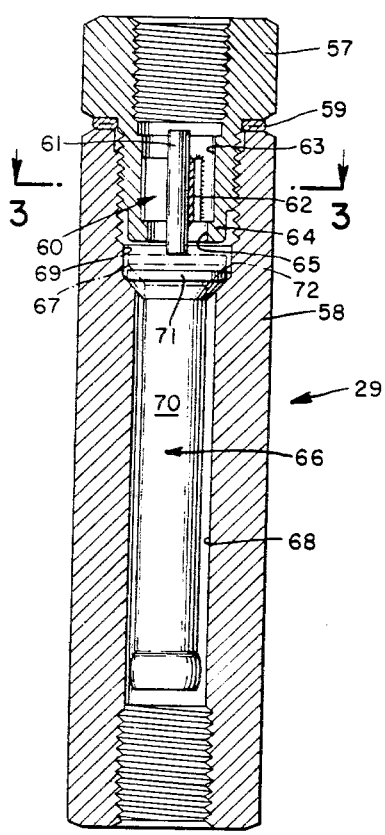
FIG. 2 is an enlarged longitudinal sectional view of one of two valves illustrated in FIG. 1.

Details of the valves 28 and 29 are illustrated in FIGS. 2, 3, 4 and 5. Valve 29 is illustrated in FIG. 2 including a fitting 57 threaded into a housing 58, and an O-ring 59 provided therebetween. A spider assembly 60 is located in the lower end of fitting 57 to support a stop pin 61 therein, stop pin 61 being welded to a spider 62 which in turn is welded to an internal bore 63 in fitting 57. Fitting 57 is provided with a flange at 64 having a bore 65 therein to permit the flow of fluid in either direction through fitting 57. Pin 61 prevents a float indicated at 66 from rising further in housing 58 than the dotted line position shown at 67. This means that fluid can flow in either direction around float 66 provided pressure above float 66 is not sufficient to cause the valve 29 to close. However, as can be seen in the system of FIG. 1, water never generally flows downwardly in valve 29. The flow of water in valve 29 when float 66 is in the position indicated at 67 is upwardly between float 66 and lower and middle internal cavities 68 and 69 of the valve, and upwardly into an upper internal cavity thereof defined by bore 63 over the top of float 66 through the bore 65 of flange 64.

Float 66 is provided with a cylindrical body portion 70 having radially projecting flange 71 fixed to or made integral with its upper end providing a valve to seat on a valve seat or shoulder 72 of housing 58 when the pressure above valve 29 exceeds the pressure therebelow as viewed in FIGS. 1 and 2.

Valve 29 is a float operated valve. For this reason, for the valve to remain open, the average density of the float 66 must be less than that of the medium in which it is used, namely water in the case of FIG. 1. This is the reason the valve 66 normally occupies the position indicated in dotted lines at 67 when it is located in leg 23 illustrated in FIG. 1 and piston 45 is not moved by solenoid 50 upwardly in cylinder 44 to increase the pressure in leg 23 above valve 29.

Figure 3:
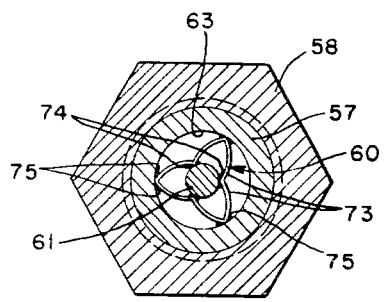
FIG. 3 is a transverse sectional view taken on the line 3—3 of the valve shown in FIG. 2.
Figure 5:
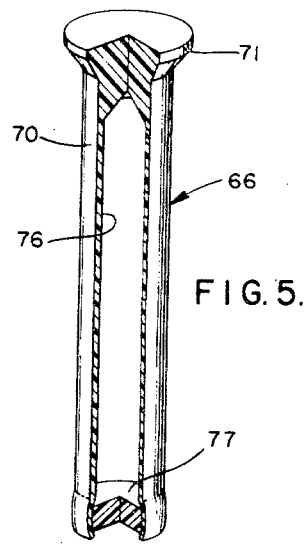
FIG. 5 is a perspective view partly in section of a float employed in both of the valves illustrated in FIGS. 2 and 4.

As shown in FIG. 3, spider 60 is made up of curved pieces of copper sheet material indicated at 73 welded both at points 74 and 75 to pin 61 and bore 63 of fitting 57, respectively. Float 66 is also indicated in FIG. 5 and as can be seen may be made of a piece of plastic material on a lathe or molded with flange 71 integral with cylindrical portions 70. The bore 76 of cylindrical portion 70 may be drilled. A plastic disc 77 may be press fit into the lower end of float 66 as shown in FIG. 5 and cemented in that position.

Figure 4:
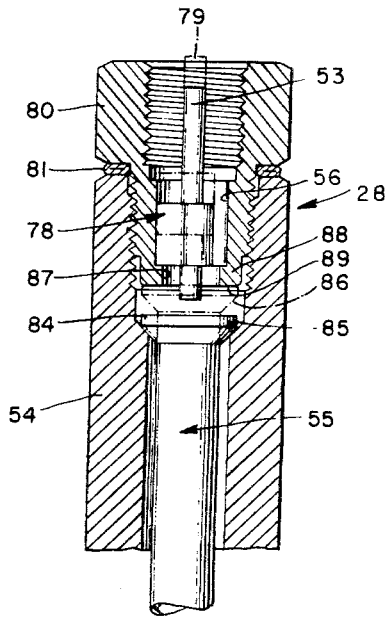
FIG. 4 is a broken away longitudinal sectional view of the other of the two valves illustrated in FIG. 1.

An upper portion of valve 28 is shown in FIG. 4, the lower portion thereof being identical to the lower portion of valve 29 shown in FIG. 2. As a matter of fact, all of the structure shown in FIG. 4 may be identical to that illustrated in FIG. 2 with the exception that welds at the points 75 are not provided, whereby the spider 78 therein may move vertically from the position shown therein to the position indicated in dotted lines at 79. Spider 78 which is fixed to pin 53 simply provides a weight which is movable.

As stated previously, the construction of valve 28 otherwise may be identical to that of valve 29. In particular, fittings 80 and 57 may be identical as well as O-rings 81 and 59. The same is true for spiders 78 and 60 as well as housings 54 and 58 and floats 55 and 66.

Float 55 is shown in solid lines in FIG. 4 in a closed position having a flange 84 fixed to or integral with its upper end in engagement with a shoulder or valve seat 85 inside body 54. Valve 28 closes when float 55 is in the position shown in solid lines upon the movement of piston 45 upwardly in cylinder 44 to dispense water from valve assembly 31. When piston 45 is moved downwardly in cylinder 44 to draw more water from tank 17 via input leg 23 of U-shaped tube 22, float 55 moves to the dotted line position indicated at 86 in FIG. 4 and thereby closes a bore 87 of a flange 88 fixed to the lower end of fitting 80 by engagement of flange 84 therewith.

When piston 45 is not moving in cylinder 44 and water is circulating in U-shaped tube 22 upwardly in leg 23 and downwardly in leg 25, float 55 is maintained in a position not shown in FIG. 4. This position is assumed by the upper end of flange 84 abutting the lower end of pin 53 in the position shown in solid lines in FIG. 4. In this regard, it is to be noted that spider 78 and pin 53 are prevented from falling inside housing 54 or inside bore 56 of fitting 80 farther than flange 88 because the outer edges of spider 78 rest on flange 88. The buoyancy of float 55 is less than the weight of spider 78 and pin 53. That is, under the conditions stated, i.e., piston 45 does not move, the upper end of flange 84 abuts the lower end of pin 53 in the position shown in solid lines in FIG. 4. It will be appreciated that valve 28 is not only a float operated valve, but also a gravity operated valve.

From the foregoing, it will be appreciated that the present invention overcomes the disadvantages of the prior art by avoiding the use of a complicated valve system and centrifugal pump to circulate water in U-shaped tube 22. In accordance with the present invention insulating leg 23 and bare portions 30 of leg 25 causes hot water to circulate by virtue of the increased density of the water in portions 30 of leg 25 relative to the water in leg 23.

Still further, a striking advantage of the apparatus of the invention is that for a constant water temperature in tank 17, circulation in the U-shaped tube 22 increases as the ambient temperature decreases because the water in portions 30 of leg 25 becomes still "heavier" to increase the differential circulation pressure. Hence, in accordance with the apparatus of the present invention, compensation for low and changing ambient temperatures is made automatically to keep the water dispensing valve 31, the U-shaped tube 22 other than at portions 30 and other structures associated with, connected with, or positioned adjacent portions of U-shaped tube 22 other than portions 30 thereof of leg 25 at a substantially constant and at a relatively high temperature independent of ambient temperature.

Still further, the lower end of the leg 23 terminates at 24 adjacent the lower central portion of tank 17 adjacent heating element 19 whereas leg 25 terminates at 26 at the upper portion on the side of tank 17 to increase the differential circulation pressure.

In addition to the foregoing features, another is also provided in that valve 28 closes when the differential pressure thereacross exceeds a predetermined amount regardless of on which side of the valve the pressure is highest. This means that when piston 45 moves downwardly in cylinder 44, colder water in portions 30 of leg 25 will not be drawn up into U-shaped tube 22 or cylinder 44 when cylinder 44 fills.

Another outstanding feature of the invention is the use of the particular valves 28 and 29 of the constructions illustrated in FIGS. 2, 3, 4 and 5. These valves are extremely sensitive and accurate although the valve 28 will not close in response to the differential pressure creased by the relatively high heat transfer rate of the portions 30 of leg 25 not insulated relative to that in those portions of U-shaped tube 22 insulated at 27. Nevertheless, neither of the valves 28 or 29 are operated electrically.

Note will be taken that water in tank 17 adjacent the lower end 24 of leg 23 will be warmer than water in tank 17 at the lower end 26 of leg 25. This is true because heating element 19 is simply placed closer to end 24 than it is to end 26. Thus, if all the insulation shown in FIG. 1 were removed, the water in leg 25 would be cooler than the water in leg 23. This would therefore cause a moderate flow of water to heat the dispensing valve assembly 31.

Although only one specific embodiment of the system of the invention has been described and illustrated, it is to be expressly understood that the invention is by no means limited to the embodiment selected to be so described and illustrated. Many changes and modifications of the invention will of course suggest themselves to those skilled in the art. Thus, the invention is defined only in the appended claims.

What is claimed is:

1. Hot water dispensing apparatus comprising: a tank; an inverted U-shaped tube having downwardly extending legs connected to said tank at different corresponding positions; dispensing means connected with said tube at the top thereof between said legs; a first check valve in one of said legs, said first check valve being adapted to close when the pressure in a portion of said one leg between said first check valve and said dispensing means is greater than that in a portion of said one leg between said first check valve and said tank; a second check valve in the other of said legs, said second check valve being adapted to close when the pressure in said other leg thereabove exceeds that in said other leg therebelow by a predetermined amount; a cylinder between said check valves, said cylinder having a piston therein to move water outwardly of said dispensing means; and means to move said piston into said cylinder at a rate to cause pressure in said tube between said check valves to rise to a magnitude sufficient to close both of said valves.

2. Hot water dispensing apparatus comprising: a tank; an inverted U-shaped tube having downwardly extending legs connected to said tank at different corresponding positions; dispensing means connected with said tube at the top thereof between said legs; a first check valve in one of said legs, said first check valve being adapted to close when the pressure in a portion of said one leg between said first check valve and said dispensing means is greater than that in a portion of said one leg between said first check valve and said tank; a second check valve in the other of said legs, said second check valve being adapted to close when the pressure in said other leg thereabove exceeds that in said other leg therebelow by a predetermined amount; a cylinder between said check valves, said cylinder having a piston therein to move water outwardly of said dispensing means; means to move said piston into said cylinder at a rate to cause pressure in said tube between said check valves to rise to a magnitude sufficient to close both of said valves; and means to maintain water in said tube and in said tank under pressure.

3. Hot water dispensing apparatus comprising: a tank; an inverted U-shaped tube having downwardly extending legs connected to said tank at different corresponding positions; dispensing means connected with said tube at the top thereof between said legs; a first check valve in one of said legs, said first check valve being adapted to close when pressure in a portion of said one leg between said first check valve and said dispensing means is greater than that in a portion of said one leg between said first check valve and said tank; a second check valve in the other of said legs, said second check valve being adapted to close when differential of pressures across it are of predetermined magnitudes regardless of whether or not the water pressure thereabove in said other leg is higher or lower than the water pressure therebelow in said other leg; greater insulation on said one of said legs than on the other, said legs having openings into said tank surrounded by water, said openings being located in positions such that water surrounding said one leg is warmer than water surrounding said other leg; means to heat said tank; a displacement cylinder connected with said tube between said check valves, said cylinder having a piston therein to move water outwardly of said dispensing means; and means to move said piston into said cylinder at a rate to cause pressure in said tube between said check valves to rise to a magnitude sufficient to close both of said valves and to move said piston out of said cylinder at a rate to cause pressure in said tube between said check valves to be sufficiently low to cause said second check valve to close again, whereby cooling of said cylinder, said piston, said dispensing means, and said tube between said check valves by cooler water in said other leg thereof below said check valve is prevented.

4. Hot water dispensing apparatus comprising: a tank; an inverted U-shaped tube having downwardly extending legs connected to said tank at different corresponding positions, one of said legs having an opening in said tank near the bottom thereof and the other of said legs having an opening in said tank near the top thereof; dispensing means connected with said tube at the top thereof between said legs; a first check valve in one of said legs, said first check valve being adapted to close when pressure in a portion of said one leg between said first check valve and said dispensing means is greater than that in a portion of said one leg between said first check valve and said tank; a second check valve in the other of said legs, said second check valve being adapted to close when differential pressures across it are of predetermined magnitudes regardless of whether or not the water pressure thereabove in said other leg is higher or lower than the water pressure therebelow in said other leg; greater insulation on said one of said legs than on the other, said legs having openings into said tank surrounded by water, said openings being located in positions such that water surrounding said one leg is warmer than water surrounding said other leg; means to heat the bottom of said tank; a displacement cylinder connected with said tube between said check valves, said cylinder having a piston therein to move water outwardly of said dispensing means; means to move said piston into said cylinder at a rate to cause pressure in said tube between said check valves to rise to a magnitude sufficient to close both of said valves and to cause pressure in said tube between said check valves to be sufficiently low to cause said second check valve to close again, whereby cooling of said cylinder, said piston, said dispensing means, and said tube between said check valves by cooler water in said other leg thereof below said check valve is prevented; and means to maintain water in said tube and in said tank under pressure.

5. Hot water dispensing apparatus comprising: a tank; an inverted U-shaped tube having downwardly extending legs connected to said tank at different corresponding positions; dispensing means connected with said tube at the top thereof between said legs; a first check valve in one of said legs, said first check valve being adapted to close when pressure in a portion of said one leg between said first check valve and said dispensing means is greater than that in a portion of said one leg between said first check valve and said tank; a second check valve in the other of said legs, said second check valve being adapted to close when differential of pressures across it are of predetermined magnitudes regardless of whether or not the water pressure thereabove in said other leg is higher or lower than the water pressure therebelow in said other leg; greater insulation on said one of said legs than on the other, said legs having openings into said tank surrounded by water, said openings being located in positions such that water surrounding said one leg is warmer than water surrounding said other leg; means to heat said tank; a displacement cylinder connected with said tube between said check valves, said cylinder having a piston therein to move water outwardly of said dispensing means; means to move said piston into said cylinder at a rate to cause pressure in said tube between said check valves to rise to a magnitude sufficient to close both of said valves and to move said piston out of said cylinder at a rate to cause pressure in said tube between said check valves to be sufficiently low to cause said second check valve to close again, whereby cooling of said cylinder, said piston, said dispensing means, and said tube between said check valves by cooler water in said other leg thereof below said check valve is prevented; and means to maintain water in said tube and in said tank under pressure.

References Cited by the Examiner
UNITED STATES PATENTS

| | | | |
|---|---|---|---|
| 1,141,243 | 6/15 | Foster | 239—135 X |
| 1,758,984 | 5/30 | Stricker | 239—139 X |
| 2,079,898 | 5/37 | Burchenal | 222—146 |
| 2,123,604 | 7/38 | Johnson | 239—128 X |

RAPHAEL M. LUPO, *Primary Examiner.*